(12) United States Patent
Manickam et al.

(10) Patent No.: US 12,549,481 B2
(45) Date of Patent: Feb. 10, 2026

(54) PROACTIVE HASHING FOR PACKET PROCESSING ENGINE

(71) Applicant: Cisco Technology, Inc., San Jose, CA (US)

(72) Inventors: Arul Murugan Manickam, San Jose, CA (US); Pritam Baruah, Fremont, CA (US); Avinash Shah, Pleasanton, CA (US); Amulya Kundur, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 18/773,086

(22) Filed: Jul. 15, 2024

(65) Prior Publication Data

US 2025/0317391 A1 Oct. 9, 2025

Related U.S. Application Data

(60) Provisional application No. 63/631,912, filed on Apr. 9, 2024.

(51) Int. Cl.
*H04L 45/7453* (2022.01)
*H04L 41/0893* (2022.01)
*H04L 47/125* (2022.01)

(52) U.S. Cl.
CPC ...... *H04L 45/7453* (2013.01); *H04L 41/0893* (2013.01); *H04L 47/125* (2013.01)

(58) Field of Classification Search
CPC ............. H04L 45/7453; H04L 41/0893; H04L 47/125; H04L 45/64; H04L 45/021; H04L 45/028; H04L 45/04; H04L 45/38; H04L 45/44; H04L 45/76; H04L 49/3063
See application file for complete search history.

(56) References Cited

U.S. PATENT DOCUMENTS

| | | | |
|---|---|---|---|
| 9,432,245 B1* | 8/2016 | Sorenson, III | ........ H04L 47/125 |
| 9,559,961 B1* | 1/2017 | Sorenson, III | ........ H04L 47/125 |
| 9,871,712 B1* | 1/2018 | Sorenson, III | .......... H04L 43/10 |
| 10,158,573 B1* | 12/2018 | Lee | ........ H04L 47/125 |
| 2005/0005006 A1* | 1/2005 | Chauffour | ........... H04L 67/1029 |
| | | | 709/223 |

(Continued)

FOREIGN PATENT DOCUMENTS

CN 1725702 A 1/2006

OTHER PUBLICATIONS

Hanna M., et al., "Progressive Hashing for Packet Processing Using Set Associative Memory", ResearchGate, ANCS'09, Oct. 9-20, 2009, 11 Pages.

*Primary Examiner* — Greg C Bengzon
(74) *Attorney, Agent, or Firm* — Polsinelli P.C.

(57) ABSTRACT

The present technology carries a calculated hash value from a standby node to an active node in an HA cluster when the packet is redirected to the active node. The hash value calculated at the standby node can be placed in the peer divert header during inner Layer 3 processing and carried to the active node in a local data bus or data line. The active node can then decode the hash value received from the standby node using the divert header. In doing so, security is preserved for the transmitted packet, but the active node can also load balance the packet based on the hash value calculated by the standby node.

20 Claims, 6 Drawing Sheets

(56) References Cited

U.S. PATENT DOCUMENTS

| | | | |
|---|---|---|---|
| 2010/0262650 A1* | 10/2010 | Chauhan | H04L 67/55 709/203 |
| 2012/0033673 A1 | 2/2012 | Goel | |
| 2013/0336329 A1 | 12/2013 | Gopinath et al. | |
| 2013/0339516 A1* | 12/2013 | Chauhan | H04W 4/18 709/224 |
| 2013/0343377 A1* | 12/2013 | Stroud | H04L 45/7453 370/389 |
| 2014/0304399 A1* | 10/2014 | Chaudhary | G06F 11/3093 709/224 |
| 2014/0310390 A1* | 10/2014 | Sorenson, III | H04L 67/1023 709/223 |
| 2014/0310391 A1* | 10/2014 | Sorenson, III | H04L 67/1001 709/223 |
| 2014/0310417 A1* | 10/2014 | Sorenson, III | H04L 45/04 709/226 |
| 2014/0310418 A1* | 10/2014 | Sorenson, III | H04L 67/1023 709/226 |
| 2015/0089566 A1* | 3/2015 | Chesla | H04L 63/1441 726/1 |
| 2016/0028630 A1 | 1/2016 | Wells | |
| 2016/0056996 A1* | 2/2016 | Anand | G06F 9/5061 370/221 |
| 2016/0094456 A1* | 3/2016 | Jain | H04L 41/5054 370/235 |
| 2018/0077118 A1 | 3/2018 | Lopez et al. | |
| 2021/0067468 A1* | 3/2021 | Cidon | H04L 45/42 |
| 2021/0314277 A1* | 10/2021 | Rolando | H04L 63/306 |
| 2023/0118718 A1* | 4/2023 | Solanki | H04L 12/4633 726/12 |
| 2023/0188461 A1* | 6/2023 | Ponnuru | H04L 45/64 709/238 |
| 2024/0223353 A1* | 7/2024 | Raman | H04L 49/3063 |
| 2024/0333649 A1* | 10/2024 | Nag | H04L 47/115 |
| 2025/0047589 A1* | 2/2025 | Kamisetty | H04L 45/64 |
| 2025/0141954 A1* | 5/2025 | Power | H04L 67/1012 |
| 2025/0247320 A1* | 7/2025 | Manickam | H04L 45/03 |

* cited by examiner

PROACTIVE HASHING FOR PACKET PROCESSING ENGINE

CROSS-REFERENCE TO RELATED APPLICATIONS

This application claims priority to U.S. Provisional Patent Application No. 63/631,912, filed Apr. 9, 2024, the contents of which are hereby incorporated by reference in their entirety.

BACKGROUND

Packet hashing is used in various stages of packet processing for load balancing and resource selection purposes. For example, a packet received at an active node of a high availability cluster (HA cluster) may undergo hashing by the active node and then undergo load balancing based on the calculated hash value. However, the hashing operation is wasted if a packet is received at a standby node due to the inner payload being encrypted during the encapsulation stage of packet processing. The active node will not know the result of the hash operation in this scenario and will instead be forced to randomly load balance the packet or route the packets along the same route, resulting in suboptimum packet routing.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Over View

Packet processing in HA clusters can suffer from inefficiencies caused by security measures. Packets can be received at a standby node within an HA cluster. The standby node can then begin packet processing for several stages, including by performing a hashing operation to determine how the packet is to be load balanced. The standby node will eventually determine that the packet should be routed by the active node and will then transmit the packet across an encrypted link. The encryption protects the integrity of the packet payload but prevents the active node from "seeing" the calculated hash value and load balancing on that basis. The active node will instead route the packet at random and potentially cause inefficiencies in the overall routing of packets from the HA cluster.

As with other security measures, the encryption of a packet is critical. But here, the encryption of the packet prevents the active node from performing load balancing based on the hash value previously calculated by the standby node. The standby node used resources and time to perform the hashing operation, but the fruits of its labor were never utilized. Security and convenience are pulling at opposite ends of the tug-of-war rope.

The present technology carries a calculated hash value from a standby node to an active node in an HA cluster when the packet is redirected to the active node. The hash value calculated at the standby node can be placed in the peer divert header during inner Layer 3 processing and carried to the active node in a local data bus or data line. The active node can then decode the hash value received from the standby node by inspecting and decrypting the divert header. In doing so, security is preserved for the transmitted packet, but the active node can also load balance the packet based on the hash value calculated by the standby node.

Example Embodiments

Figure 1:
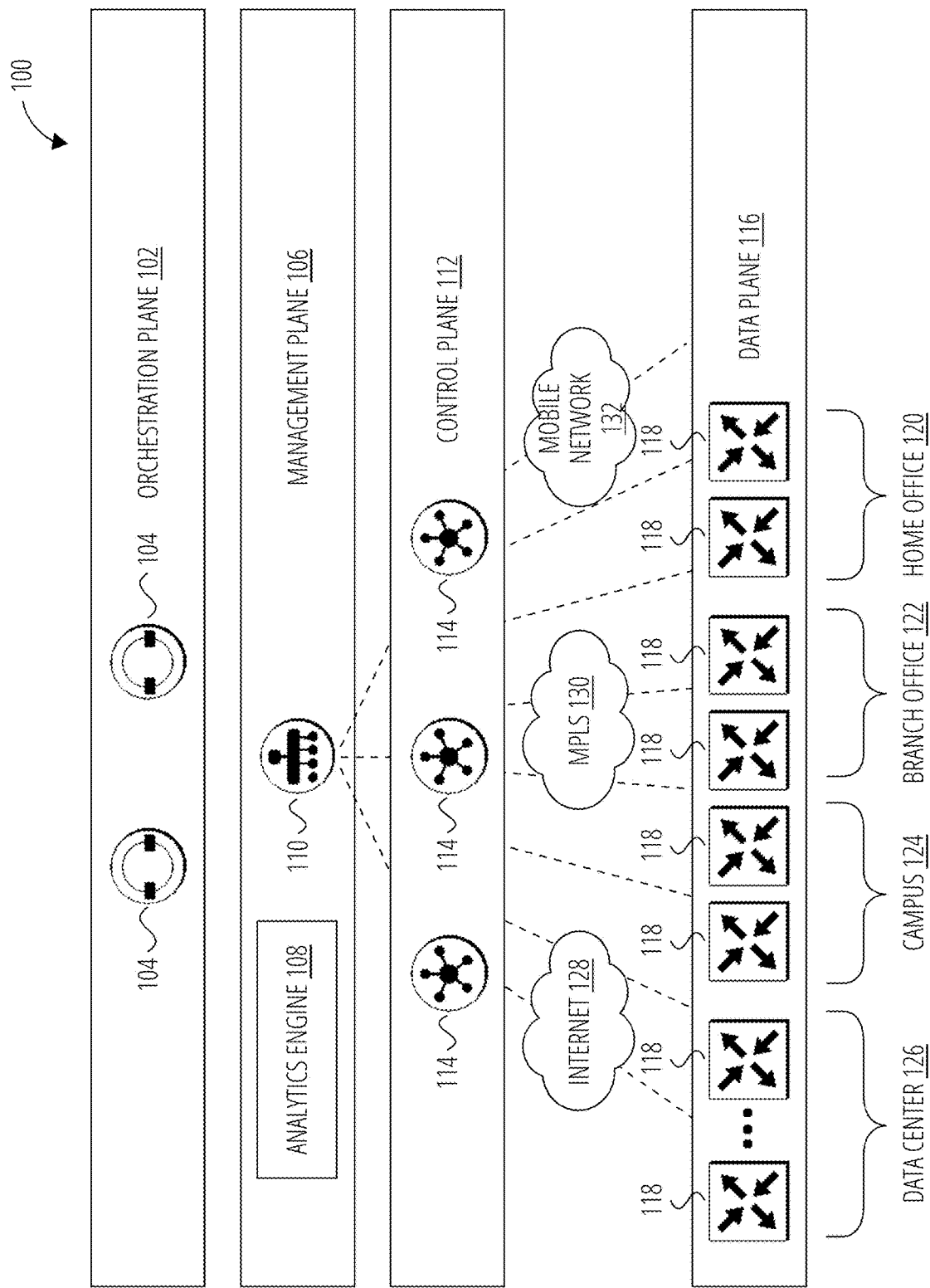
FIG. 1 illustrates an example of a high-level network architecture in accordance with some embodiments of the present technology.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106 with an analytics engine 108, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 118.

Figure 2:
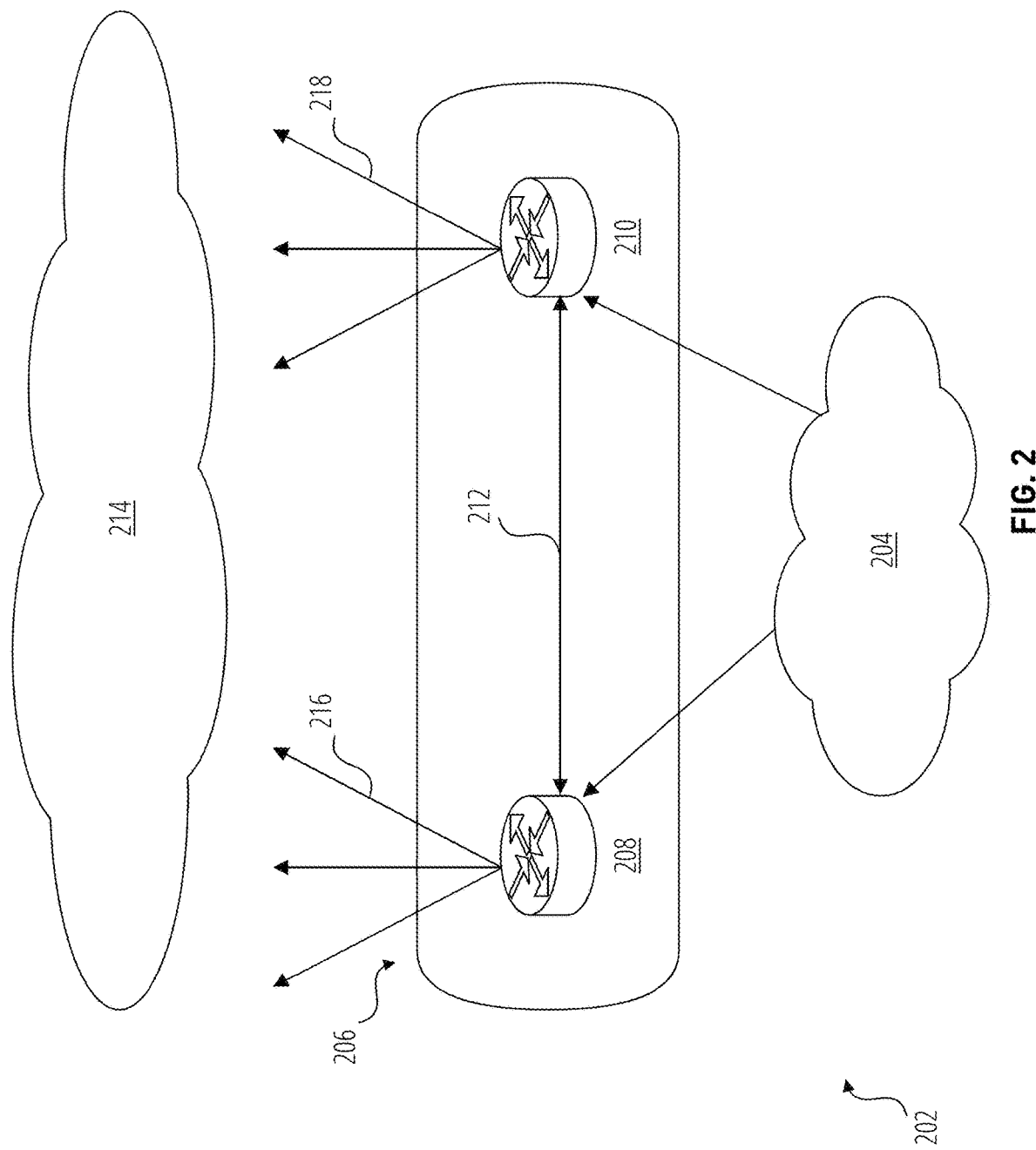
FIG. 2 illustrates a schematic diagram of an HA cluster according to some embodiments of the present technology.

FIG. 2 illustrates a schematic diagram of an HA cluster network 202 according to some embodiments of the present technology. In general, HA clusters are designed to ensure that a system remains operational, even if some components fail. To do this, HA clusters can involve multiple nodes that work together to provide redundancy in the event of a failure. Each node in the cluster can perform the same functions so that if one node goes offline due to hardware malfunction, software crash, or maintenance needs, the other nodes can automatically take over the tasks with minimal or no disruption to the service. Additionally, HA clusters are typically equipped with mechanisms for data synchronization across nodes, ensuring that all nodes maintain an up-to-date state of the shared data. This architecture not only increases the availability of services but also enhances the overall resilience of the system against various types of faults.

As shown, the HA cluster network 202 can include an upstream network 204 that can transmit data packets into the HA cluster 206 to either a first node 208 or a second node 210. The first node 208 and the second node 210 can be operatively coupled by a peer link 212 for synchronization and packet routing purposes, for example. The first node 208 and the second node 210 can transmit data traffic out of the HA cluster 206 to a downstream network 214. For example, the first node 208 can transmit data traffic to the downstream network 214 via first links 216. Similarly, the second node 210 can transmit data traffic out of the HA cluster 206 the downstream network 214 via second links 218.

The first node 208 and the second node 210 can operate in several different modes, and the selected mode can be controlled by a network administrator. For example, the first node 208 and the second node 210 can operate in active-standby mode, where an active node handles routing tasks while the standby node remains idle until the active node fails or needs maintenance, at which point the standby node can take over as the active node. In this scenario, the standby node might receive a packet for which it is the standby node, but might perform certain stages of packet processing before determining that the packet should be forwarded to the active node. The first node 208 and the second node 210 can also operate in active-hot standby mode, where one node is active and the other node continuously mirrors the operations of the active node, ready to take over instantly without any disruption if the active node fails. In other examples, the first node 208 and the second node 210 can operate in active-active mode, where both nodes are fully operational and share the workload evenly, improving performance and redundancy since both can handle requests and tasks concurrently, but perhaps at the expense of increased complexity in managing data synchronization, symmetrical routing, and conflict resolution across nodes. In the scenarios above, the first node 208 may be active in one scenario but the second node 210 may be active in another. Further, the active/standby/hot standby status is not static. That is, the first node 208 and the second node 210 may be active one moment but operate in the standby or hot-standby mode in another moment. The overall mode of operation, and the specific mode of the first node 208 or the second node 210, may be dynamic and change, in some embodiments. Additionally, any number of nodes can be implemented, and the discussion above with respect to the first node 208 and the second node 210 is for explanatory purposes only. Any other manner of operation for the first node 208 and the second node 210, and any number of nodes, can be implemented without departing from the spirit and scope of the present technology.

The first node 208 and the second node 210 are operatively coupled together by a peer link 212. The peer link 212 serves as a dedicated communication channel that allows the first node 208 and the second node 210 to continuously share status information, synchronize state data, and coordinate operations seamlessly. The peer link 212 is therefore helpful in maintaining the integrity and consistency of data across the HA cluster 206, as it ensures that the first node 208 and the second node 210 have the same information at any given time. In the event of a node failure, the peer link 212 facilitates the rapid failover process by enabling the healthy node to quickly assume full control without data loss or significant downtime. Furthermore, the peer link 212 can also be used for load balancing decisions, helping to distribute workload evenly between the first node 208 and the second node 210 to optimize performance and resource utilization. The peer link 212 can be any component that enables communication between the first node 208 and the second node 210, for example, a dedicated Ethernet connection, fiber optic cables, data bus, data line, or even wireless communication links, depending on the specific requirements and architecture of the HA cluster 206.

The first links 216 and the second links 218 allow the HA cluster 206 to egress packets from the first node 208 and the second node 210, respectively. The first links 216 and the second links 218 can each be a plurality of links to allow the first node 208 and the second node 210 to implement load balancing when transmitting data traffic to the downstream network 214. For example, the first links 216 and the second links 218 can be comprised of multiple Ethernet cables, fiber optic connections, or wireless links, each configured to handle part of the traffic flow.

A data packet may travel through the HA cluster network 202 in the following manner, which is merely an example. The packet may enter the HA cluster 206 and proceed to either the first node 208 or the second node 210. For example, assume the first node 208 is active and the second node 210 is in standby node. If the packet were to first reach the second node 210, it would first undergo some packet processing before the second node 210 determines the packet should instead be routed by the first node 208. Here, the second node 210 would transmit the packet across the peer link 212 to the first node 208 upon making that determination. The first node 208 would then route the packet across one of the first links 216 to the downstream network 214.

As used herein, the upstream network 204 and the downstream network 214 are so named for explanatory purposes only. Of course, a packet may travel in the reverse direction where the downstream network 214 is in fact upstream, and where the upstream network 204 is in fact downstream.

Figure 3A:
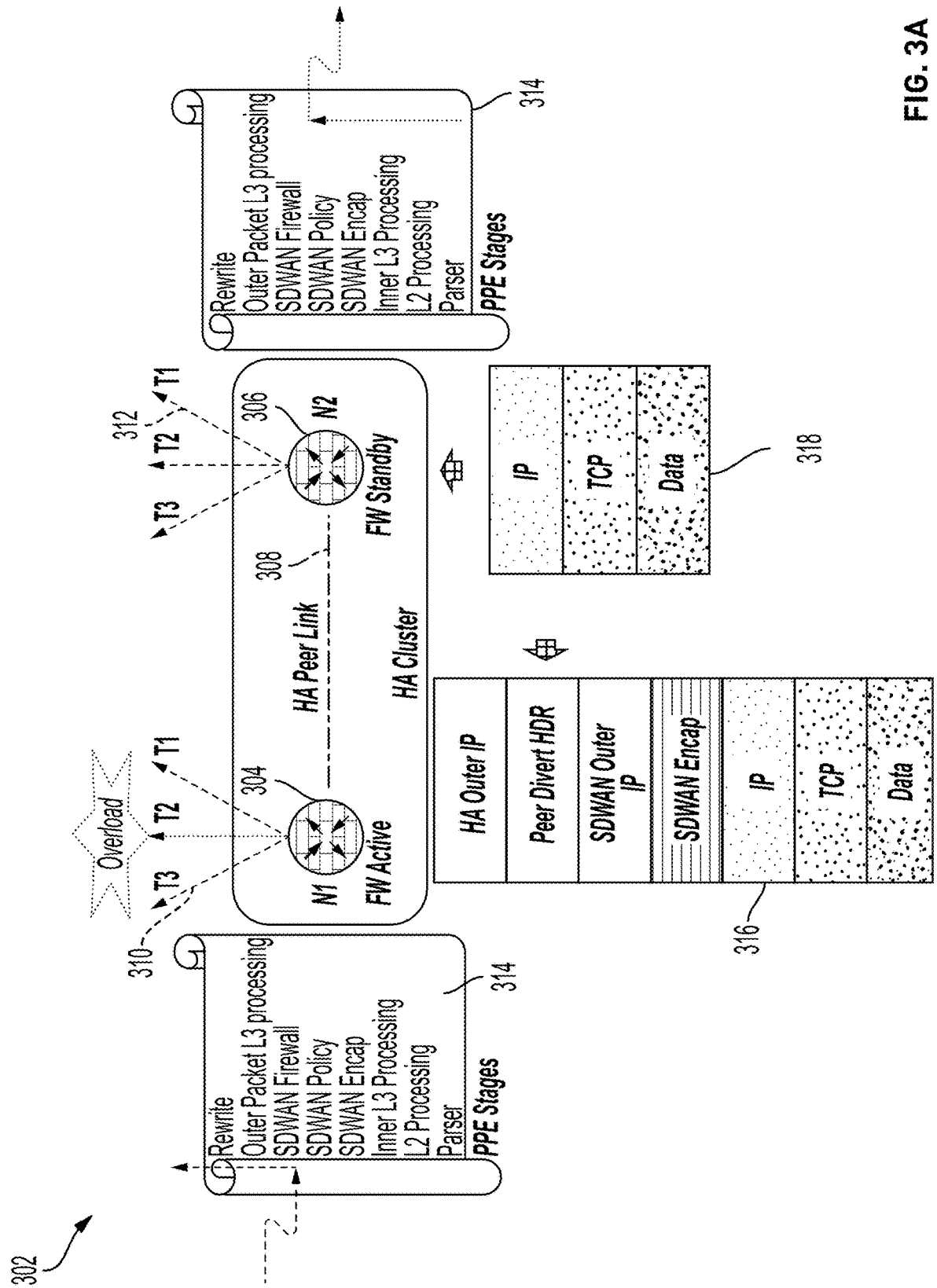
FIG. 3A illustrates another schematic diagram of an HA cluster with certain packet processing steps initiated by a standby node, according to some embodiments of the present technology.

FIG. 3A illustrates another schematic diagram of an HA cluster 302 with certain packet processing steps initiated by a standby node, according to some embodiments of the present technology. As shown, an HA cluster 302 can include a first node 304 and a second node 306 operatively coupled together by a peer link 308. The first node 304 can transmit packets across first links 310 and the second node 306 can transmit packets across second links 312. The first node 304 and the second node 306 process the packet according to the stages set forth in the packet processing engine stages 314. The first node 304 will perform packet processing on the first packet portion 316 and the second node will perform packet processing on the second packet portion 318 that remains after packet processing of the first packet portion 316.

The configuration of FIG. 3A illustrates the problem of packet processing and hashing by the standby node. As shown, the packet will reach the HA cluster 302 and be directed to the second node 306, which in this example is the standby node. The second node 306 would begin packet processing without knowing whether the packet is to be routed by the second node 306 or if, instead, the packet should be forwarded to the first node 304 across the peer link 308. Here, the second node 306 processes the packet through the parser, Layer 2 processing, inner Layer 3 processing, SD-WAN encapsulation, and SD-WAN policy stages as shown in the packet processing engine stages 314. The second node 306 can calculate the hash value in a variety of ways and at different stages of packet processing. In one embodiment, the hash value is calculated during the inner Layer 3 processing stage. In the subsequent SD-WAN encapsulation stage, the packet, including the hash value, is encrypted, securing its contents for transmission across the peer link 308.

The second node 306 will then recognize the packet needs to be forwarded to the first node 304. However, due to the encryption performed during the SD-WAN encapsulation stage, the inner payload of the packet is encrypted and no other stages in the packet processing engine can interpret the inner payload. Accordingly, the hash value calculated by the second node 306 is wasted, and the packet is instead routed at random or based on header information, for example, the outer source IP address and destination IP address. But, in the case of an SD-WAN, the outer tunnel source IP address and destination IP address would be the same, meaning the packets would all be transmitted down the same link among the first links 310. In some situations, this results in overload of the link (for example, the central link of the first links 310 in FIG. 3A).

Figure 3B:
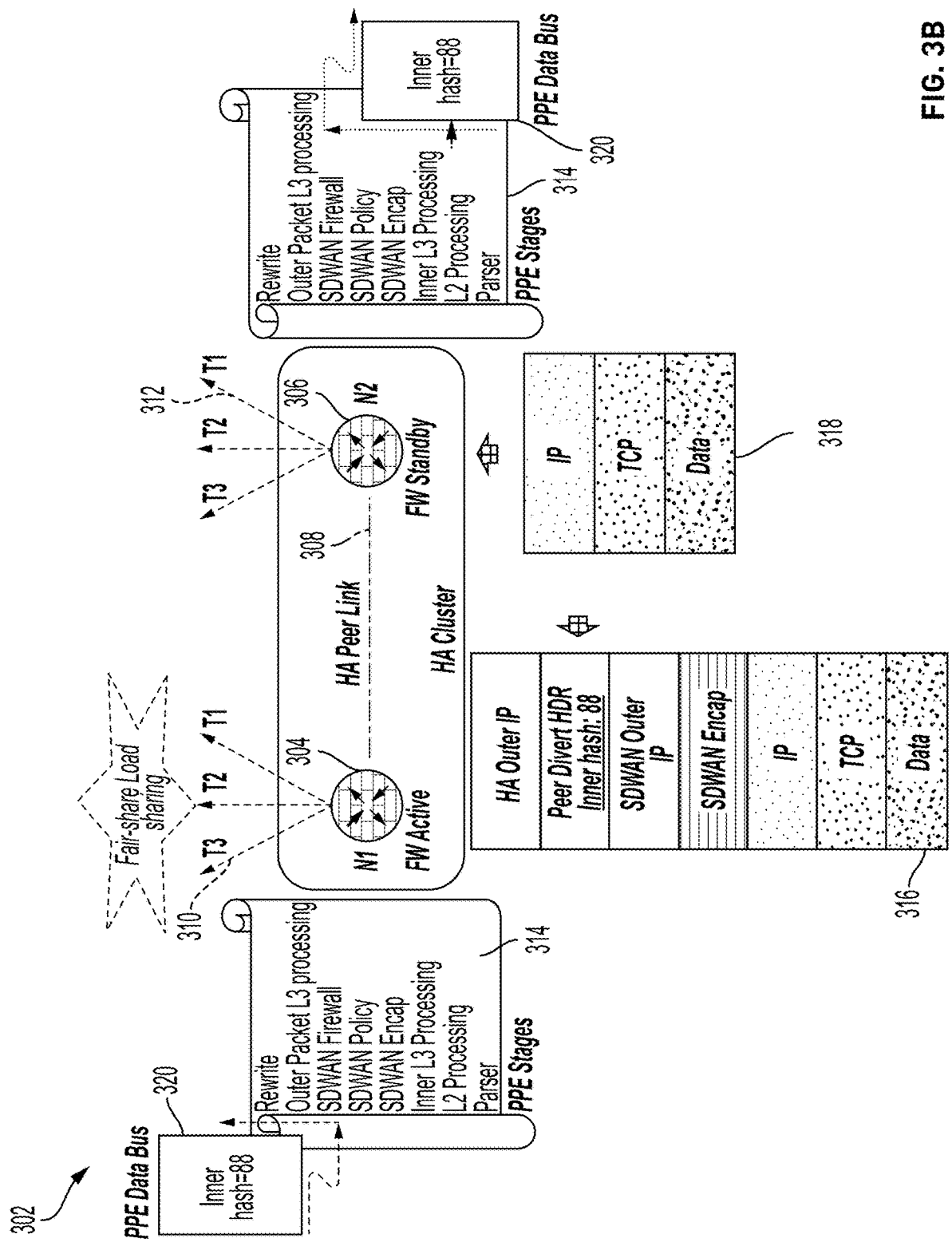
FIG. 3B illustrates another schematic diagram of an HA cluster where a packet has been transmitted to an active node, according to some embodiments of the present technology.

FIG. 3B illustrates another schematic diagram of an HA cluster 302 where a packet has been transmitted to an active node, according to some embodiments of the present technology, with like numerals representing like elements as compared to FIG. 3A. Here, a data packet is received at the second node 306 of an HA cluster 302. The second node 306 can then perform a portion of packet processing on the data packet. For example, as shown, the second node 306 performs the parser, Layer 2 processing, inner Layer 3 processing, SD-WAN encapsulation, SD-WAN policy, and reaches the SD-WAN firewall stages of packet processing. In an embodiment, during Layer 3 processing, the second node 306 calculates the hash value and attaches the hash value as metadata associated with the packet. For example, the metadata can include a peer divert header, and the hash value can be attached in the peer divert header. In the example shown in FIG. 3B, the hash value was calculated as 88.

A peer divert header is a header or field in data packets that is used to manage or control the flow of traffic between peer nodes within an HA cluster. The peer divert header can be particularly helpful in scenarios where traffic needs to be dynamically redirected from the standby node to the active node to ensure high availability and failover. There are several advantages of attaching the hash value in the peer divert header rather than in other fields of the data packet. For example, the peer divert header is separate from the encrypted payload of the packet. Accordingly, the active node (here, the first node 304) can continue packet processing where the standby node left off and do so while still accessing the hash value. That is, because the hash value is not part of the encrypted packet payload and is instead part of the divert header, it can be more easily digested by the first node 304 upon transmission to the first node 304 from the second node 306 across the peer link 308. However, the hash value need not be attached in the divert header and can be stored, attached, or affiliated with any other header or field, for example, the options field of the Internet Protocol (IP) or Transmission Control Protocol (TCP) headers, custom Hypertext Transfer Protocol (HTTP) headers, the key field in Generic Routing Encapsulation (GRE) headers, Multiprotocol Label Switching (MPLS) label stacks, IP Security Authentication Header (IPsec AH) for integrity checks, or within Secure Sockets Layer/Transport Layer Security (SSL/TLS) handshake messages for securing connections. The hash value also need not be attached to a field, header, or other metadata in inner Layer 3 processing and can instead be attached at any other portion of packet processing, for example, during Layer 2 processing in the MAC header, within the payload encryption metadata for SSL/TLS protocols, or included in the digital signatures of application layer protocols like Simple Mail Transfer Protocol (SMTP) or Hypertext Transfer Protocol Secure (HTTPS).

Following the attachment of the hash value as metadata, the second node 306 can then determine that the packet is to be routed by the first node 304 of the HA cluster 302. For example, the second node 306 can determine this by inspecting the packet or implementing a broader load balancing algorithm. After the second node 306 determines the packet is to be routed by the first node 304, the second node 306 can then transmit the data packet to the first node 304. For example, the second node 306 can transmit the data packet across a data bus.

The first node 304 can then receive the data packet from the second node 306 and continue packet processing. For example, the first node 304 can perform a second portion of packet processing on the data packet, where the second portion of packet processing includes consuming the metadata associated with the data packet so as to decode and read the hash value using the peer divert header. Thereafter, the first node 304 can update the hash value in the packet processing engine data bus 320 before resuming further packet processing. This allows later stages of packet processing to use the hash value for packet processing purposes. In doing so, the first node 304 can read the hash value calculated by the second node 306, and the work of the second node 306 is not wasted. Accordingly, the first node 304 can now load balance the data packet based on the hash value.

The above process is generally described as being performed by the first node 304 and the second node 306. However, the terms "first" and "second" are exemplary only and any number of nodes or any order of nodes can be implemented. Further, the above process can be implemented by a controller, for example an SD-WAN controller. The controller can include a storage configured to store instructions and at least one processor configured to execute the instructions and cause the at least one processor to perform any of the steps described herein. The storage can be a non-transitory computer-readable storage medium.

Figure 4:
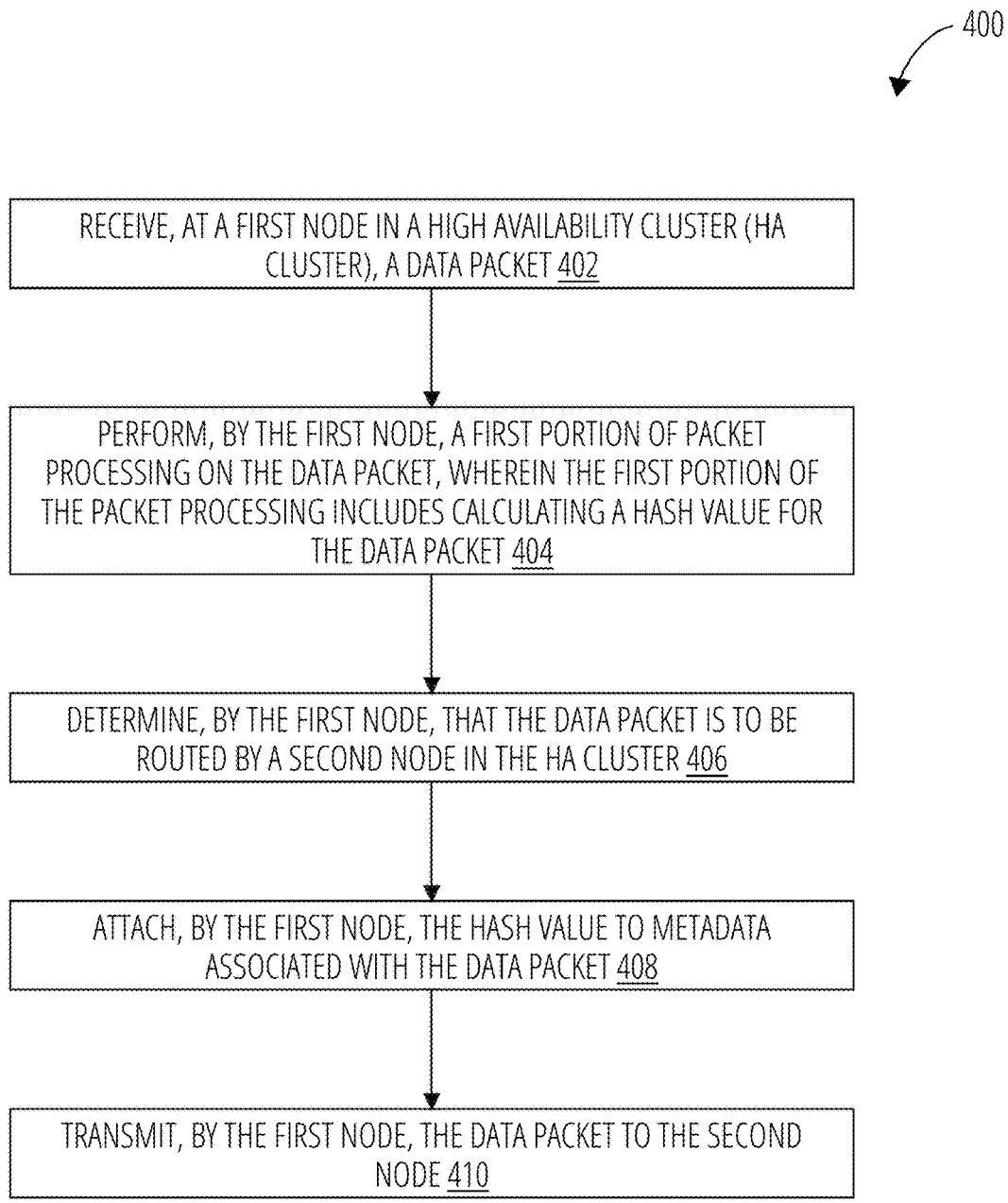
FIG. 4 illustrates a routine in accordance with some embodiments of the present technology.

FIG. 4 illustrates a routine 400 in accordance with some embodiments of the present technology. As shown, in block 402, a first node in a HA cluster receives a data packet. For example, an external network can transmit the data packet into the HA cluster as described above.

In block 404, the first node performs a first portion of packet processing on the data packet, wherein the first portion of the packet processing includes calculating a hash value for the data packet. For example, the hash value may be calculated as part of the packet processing step, in particular during Layer 3 processing.

In block 406 the first node determines that the data packet is to be routed by a second node in the HA cluster. For example, the first node can determine based on inspection of the packet or based on network policy, load balancing, or any other method, that the second node is the active node for purposes of the packet.

In block 408 the first node attaches the hash value to metadata associated with the data packet. For example, the hash value can be attached in a peer divert header of the data packet.

In block 410 the first node transmits the data packet to the second node. For example, the first node can transmit the packet across a data bus.

Figure 5:
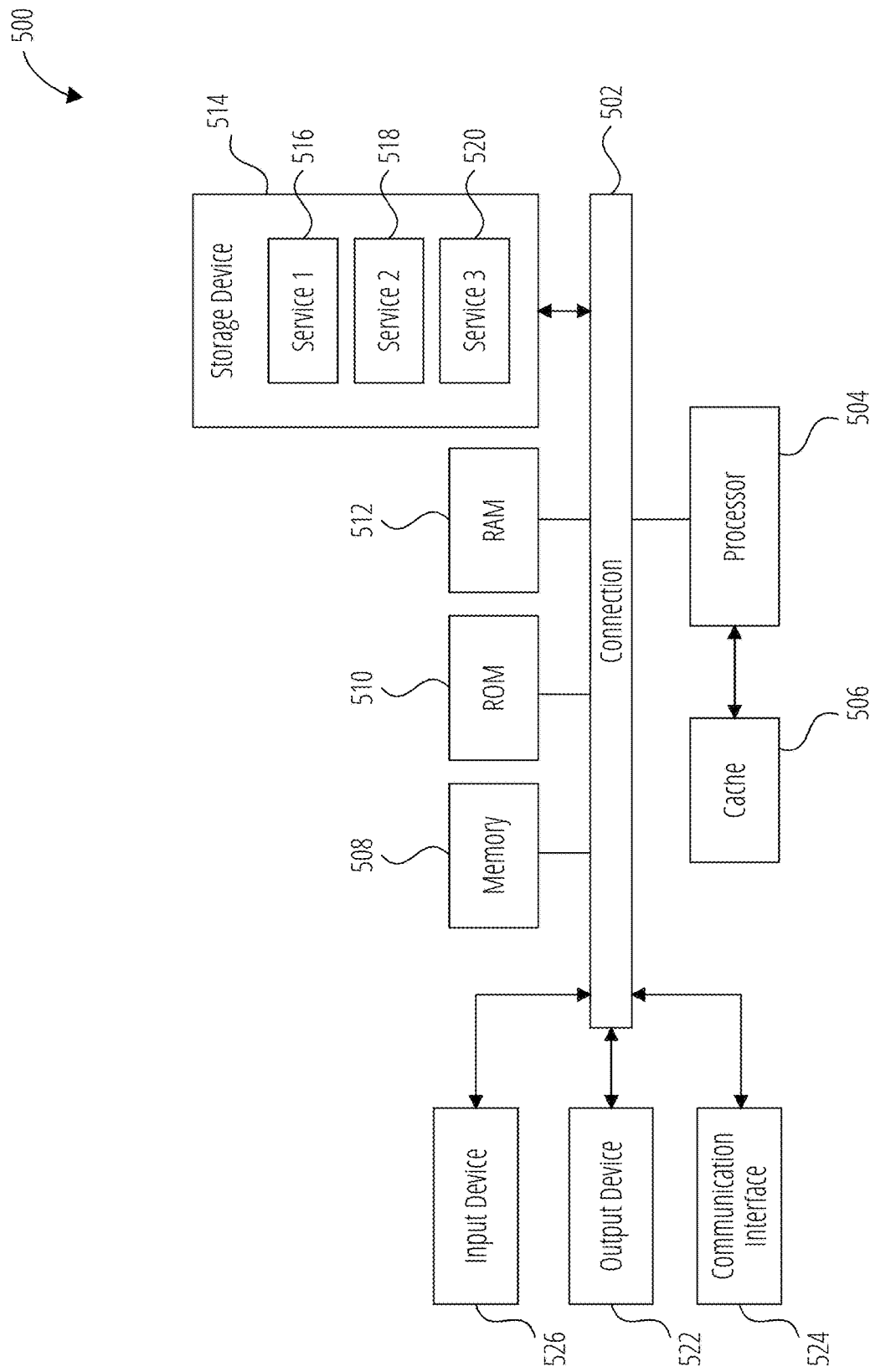
FIG. 5 shows an example of a computing system according to some embodiments of the present technology.

FIG. 5 shows an example of computing system 500, which can be for example any computing device making up a controller or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method comprising receiving, at a first node in a high availability cluster (HA cluster), a data packet; performing, by the first node, a first portion of packet processing on the data packet, wherein the first portion of the packet processing includes calculating a hash value for the data packet; determining, by the first node, that the data packet is to be routed by a second node in the HA cluster; attaching, by the first node, the hash value to metadata associated with the data packet; and transmitting, by the first node, the data packet to the second node.

Aspect 2. The method of Aspect 1, further comprising receiving, by the second node, the data packet; performing, by the second node, a second portion of the packet processing on the data packet, wherein the second portion of the packet processing includes consuming the metadata associated with the data packet so as to read the hash value; and load balancing, by the second node, the data packet based on the hash value.

Aspect 3. The method of Aspect 2, wherein the metadata includes a peer divert header, and wherein the hash value is attached in the peer divert header.

Aspect 4. The method of Aspect 3, wherein the second portion of the packet processing includes decoding the hash value using the peer divert header.

Aspect 5. The method of Aspect 1, wherein the first portion of the packet processing includes updating the hash value in a packet processing engine data bus.

Aspect 6. The method of Aspect 1, wherein attaching the hash value includes attaching the hash value during inner Layer 3 processing.

Aspect 7. The method of Aspect 1, wherein the first node is a standby node and the second node is an active node.

Aspect 8. A controller comprising a storage configured to store instructions; and at least one processor configured to execute the instructions and cause the at least one processor to perform steps comprising receiving, at a first node in a high availability cluster (HA cluster), a data packet; performing, by the first node, a first portion of packet processing on the data packet, wherein the first portion of the packet processing includes calculating a hash value for the data packet; determining, by the first node, that the data packet is to be routed by a second node in the HA cluster; attaching, by the first node, the hash value to metadata associated with the data packet; and transmitting, by the first node, the data packet to the second node.

Aspect 9. The controller of Aspect 8, wherein the instructions further cause receiving, by the second node, the data packet; performing, by the second node, a second portion of the packet processing on the data packet, wherein the second portion of the packet processing includes consuming the metadata associated with the data packet so as to read the hash value; and load balancing, by the second node, the data packet based on the hash value.

Aspect 10. The controller of Aspect 9, wherein the metadata includes a peer divert header, and wherein the hash value is attached in the peer divert header.

Aspect 11. The controller of Aspect 10, wherein the second portion of the packet processing includes decoding the hash value using the peer divert header.

Aspect 12. The controller of Aspect 8, wherein the first portion of the packet processing includes updating the hash value in a packet processing engine data bus.

Aspect 13. The controller of Aspect 8, wherein attaching the hash value includes attaching the hash value during inner Layer 3 processing.

Aspect 14. The controller of Aspect 8, wherein the first node is a standby node and the second node is an active node.

Aspect 15. A non-transitory computer-readable storage medium including instructions that, when executed by at least one processor, cause the at least one processor to perform steps comprising: receiving, at a first node in a high availability cluster (HA cluster), a data packet; performing, by the first node, a first portion of packet processing on the data packet, wherein the first portion of the packet processing includes calculating a hash value for the data packet; determining, by the first node, that the data packet is to be routed by a second node in the HA cluster; attaching, by the first node, the hash value to metadata associated with the data packet; and transmitting, by the first node, the data packet to the second node.

Aspect 16. The non-transitory computer-readable storage medium of Aspect 15, wherein the instructions further cause: receiving, by the second node, the data packet; performing, by the second node, a second portion of the packet processing on the data packet, wherein the second portion of the packet processing includes consuming the metadata associated with the data packet so as to read the hash value; and load balancing, by the second node, the data packet based on the hash value.

Aspect 17. The non-transitory computer-readable storage medium of Aspect 16, wherein the metadata includes a peer divert header, and wherein the hash value is attached in the peer divert header.

Aspect 18. The non-transitory computer-readable storage medium of Aspect 17, wherein the second portion of the packet processing includes decoding the hash value using the peer divert header.

Aspect 19. The non-transitory computer-readable storage medium of Aspect 15, wherein the first portion of the packet processing includes updating the hash value in a packet processing engine data bus.

Aspect 20. The non-transitory computer-readable storage medium of Aspect 15, wherein attaching the hash value includes attaching the hash value during inner Layer 3 processing.

What is claimed is:

1. A method comprising:
receiving, at a first node in a high availability cluster (HA cluster) currently in a standby mode, a data packet;
performing, by the first node during Layer 3 processing, a first portion of packet processing on the data packet, wherein the first portion of the packet processing includes calculating a hash value for the data packet;
determining, by the first node, that the data packet is to be routed by a second node in the HA cluster currently in an active mode;
attaching, by the first node, the hash value to metadata associated with the data packet; and
transmitting, by the first node, the data packet to the second node via a data bus.

2. The method of claim 1, further comprising:
receiving, by the second node, the data packet;
performing, by the second node, a second portion of the packet processing on the data packet, wherein the second portion of the packet processing includes consuming the metadata associated with the data packet so as to read the hash value; and
load balancing, by the second node, the data packet based on the hash value.

3. The method of claim 2, wherein the metadata includes a peer divert header, and wherein the hash value is attached in the peer divert header.

4. The method of claim 3, wherein the second portion of the packet processing includes decoding the hash value using the peer divert header.

5. The method of claim 1, wherein the first node changes to the active mode.

6. The method of claim 1, further comprising:
encrypting, the packet including the hash value for transmission across a peer link coupling the first node and the second node.

7. The method of claim 1, wherein the first node is a hot standby node.

8. A controller comprising:
a storage configured to store instructions; and
at least one processor configured to execute the instructions and cause the at least one processor to perform steps comprising:
receiving, at a first node in a high availability cluster (HA cluster) currently in a standby mode, a data packet;
performing, by the first node during Layer 3 processing, a first portion of packet processing on the data packet, wherein the first portion of the packet processing includes calculating a hash value for the data packet;
determining, by the first node, that the data packet is to be routed by a second node in the HA cluster currently in an active mode;
attaching, by the first node, the hash value to metadata associated with the data packet; and
transmitting, by the first node, the data packet to the second node via a data bus.

9. The controller of claim 8, wherein the instructions further cause:
receiving, by the second node, the data packet;
performing, by the second node, a second portion of the packet processing on the data packet, wherein the second portion of the packet processing includes consuming the metadata associated with the data packet so as to read the hash value; and
load balancing, by the second node, the data packet based on the hash value.

10. The controller of claim 9, wherein the metadata includes a peer divert header, and wherein the hash value is attached in the peer divert header.

11. The controller of claim 10, wherein the second portion of the packet processing includes decoding the hash value using the peer divert header.

12. The controller of claim 8, wherein the first node changes to the active mode.

13. The controller of claim 8, further comprising:
encrypting, the packet including the hash value for transmission across a peer link coupling the first node and the second node.

14. The controller of claim 8, wherein the first node is a hot standby node.

15. A non-transitory computer-readable storage medium including instructions that, when executed by at least one processor, cause the at least one processor to perform steps comprising:
receiving, at a first node in a high availability cluster (HA cluster) currently in a standby mode, a data packet;
performing, by the first node during Layer 3 processing, a first portion of packet processing on the data packet, wherein the first portion of the packet processing includes calculating a hash value for the data packet;
determining, by the first node, that the data packet is to be routed by a second node in the HA cluster currently in an active mode;
attaching, by the first node, the hash value to metadata associated with the data packet; and
transmitting, by the first node, the data packet to the second node via a data bus.

16. The non-transitory computer-readable storage medium of claim 15, wherein the instructions further cause:
receiving, by the second node, the data packet;
performing, by the second node, a second portion of the packet processing on the data packet, wherein the second portion of the packet processing includes consuming the metadata associated with the data packet so as to read the hash value; and
load balancing, by the second node, the data packet based on the hash value.

17. The non-transitory computer-readable storage medium of claim 16, wherein the metadata includes a peer divert header, and wherein the hash value is attached in the peer divert header.

18. The non-transitory computer-readable storage medium of claim 17, wherein the second portion of the packet processing includes decoding the hash value using the peer divert header.

19. The non-transitory computer-readable storage medium of claim 15, wherein the first node changes to the active mode.

20. The non-transitory computer-readable storage medium of claim 15, further comprising: encrypting, the packet including the hash value for transmission across a peer link coupling the first node and the second node.

* * * * *